Figure 1:
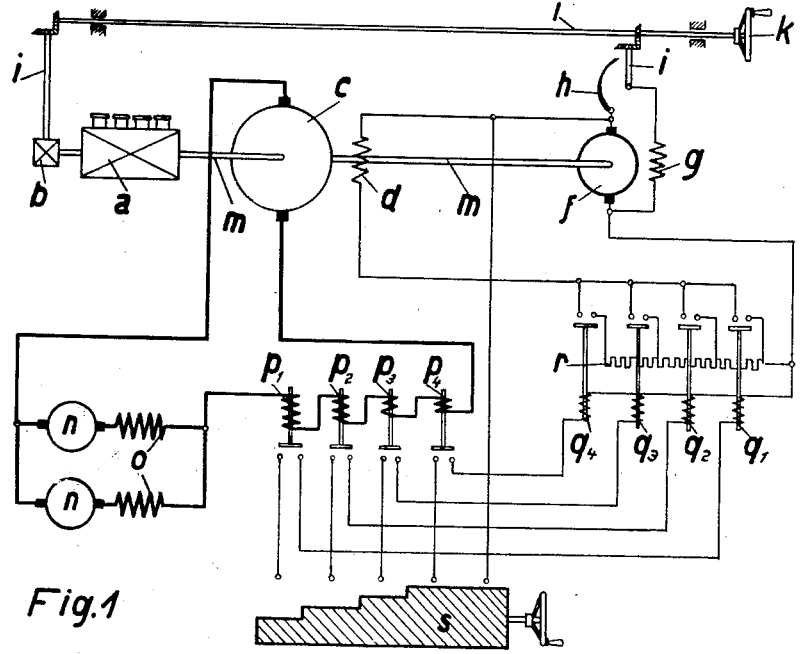

Oct. 3, 1933.  T. BOVERI ET AL  1,929,089
ELECTRIC TRAIN CONTROL SYSTEM
Filed Aug. 4, 1930  2 Sheets-Sheet 1

Inventors
Theodore Boveri
Abraham Couwenhoven
by Alfred N. Dyson
Attorney

Patented Oct. 3, 1933

1,929,089

UNITED STATES PATENT OFFICE 1,929,089

ELECTRIC TRAIN CONTROL SYSTEM

Theodore Boveri, Zurich, and Abraham Couwenhoven, Baden, Switzerland, assignors to Aktiengesellschaft Brown Boveri & Cie., Baden, Switzerland, a joint stock company of Switzerland Application August 4, 1930, Serial No. 473,116, and in Germany August 8, 1929

8 Claims. (Cl. 290—17)

The invention relates to an automatic protective arrangement for the engines of vehicles having an internal combustion engine-electric drive, more particularly a Diesel-electric drive.

It has already been proposed to build vehicles with Diesel-electric power transmission, in which the Diesel engine drives a continuous current generator which is excited by an exciting machine also driven by the main Diesel engine. This arrangement has in the first place the advantage that the voltage of the exciter machine can be kept constant and can be used for feeding the auxiliary drives, the excitation being regulated in the exciter circuit of the generator, and in the second place, that the excitation of the generator may be reduced to any desired extent without reference to the bend of the magnetization curve.

The Diesel engine has also been run at varying speeds. The normal power of the Diesel engine, which it can develop at normal mean indicated pressure and with the combustion at its best, is approximately, at least from about ⅓ to ½ its normal speed of revolution upwards, proportional to its speed of revolution. As in railway operation very greatly varying loads occur, it is possible during a considerable portion of the working period to let the Diesel engine run at a reduced speed of revolution. By this means the noise, the wear and to some extent the losses are reduced. The speed of revolution of the Diesel engine is regulated from the driver's cab by distant control, the governor when in a certain position keeping the speed of revolution constant.

It has also been proposed, when working with changeable speed of revolution of the Diesel engine, to keep the voltage of the exciter machine constant, either by changing the exciter resistance of the exciter machine, when altering the speed of revolution, or by an automatic voltage regulator or by both means. This has the advantage not only that a constant voltage is maintained for charging the battery and feeding the auxiliary services, but that the regulation is made more easy. For, assuming the generator current and consequently the torque of the driving motors which are usually series wound motors to be constant, the voltage of the generator will rise, the excitation remaining constant, and with it the power given off by the generator proportionally to the speed of revolution. As already stated, this corresponds to the characteristic of the Diesel engine, the normal power of which also rises approximately proportionally to the speed of revolution.

It is also known, that besides the influencing of the speed of revolution of the Diesel engine the excitation of the generator must be regulated in the main exciter circuit, not only for the reason that the number of working speeds of revolution of the Diesel engine is limited and that the regulation would therefore not be sufficiently fine, but also because the correct loading of the Diesel engine must be adjustable. It is very important that overloads of the Diesel engine which are detrimental to it and adversely affect its efficiency shall be avoided. While a constant excitation is satisfactory so long as the generator current and the motor torque remain constant, it is necessary that the excitation be varied, a times of variation of the generator current. In fact, assuming the speed of revolution of the Diesel engine to remain constant, every increase in the generator current would be tantamount to an overload of the Diesel engine. A controlling drum is provided for enabling the driver to regulate independently the excitation of the generator by changing resistances in the main exciter circuit.

The possibility of influencing the speed of revolution of the Diesel engine independently of the excitation of the generator is, of course, accompanied by the danger of overloading the Diesel engine. It is also possible to let the Diesel engine run unnecessarily fast. An overload will occur, when, the Diesel engine being already overloaded, the driver, for increasing the speed of travel or for maintaining it on the upgrade increasing, increases the excitation instead of increasing the speed of revolution of the Diesel engine, so that the increase in the generator voltage, which will result in both cases, shall also be accompanied by an increase in the power of the Diesel engine. Conversely, the Diesel engine will be insufficiently loaded, that is to say the speed of revolution will increase unnecessarily, if, the Diesel engine being already fully loaded, the driver, in order to slow down the speed of travel, reduces the excitation without reducing the speed of revolution of the Diesel engine.

The main object of the invention is to protect the internal combustion engine of a vehicle from being overloaded. The protection is effected according to the invention, substantially, by the provision of means for limiting the excitation of the main generator, which by the automatic control of resistances in its exciter circuit prevents the generator torque exceeding predetermined values, so that the engine may be always operated with full torque.

Figure 2:
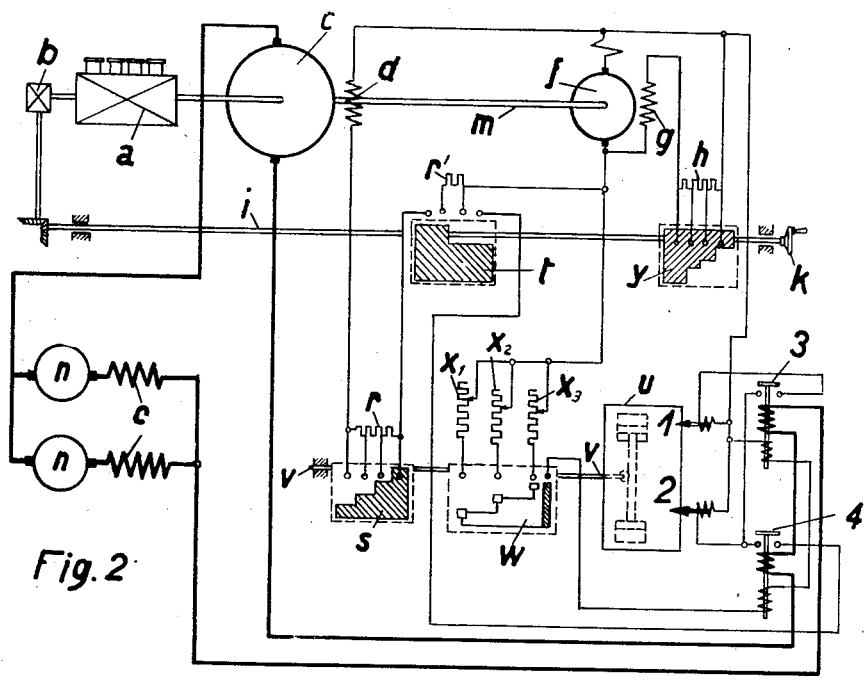
Figure 3:
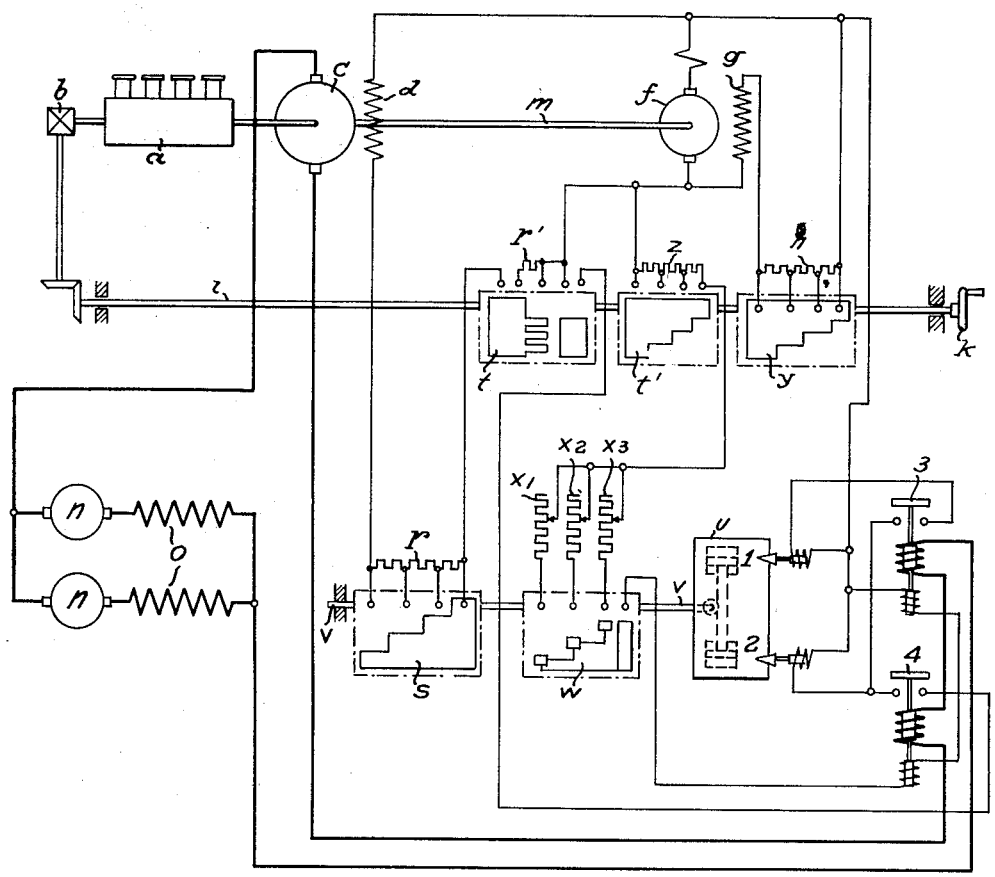

In Figs. 1, 2 and 3 of the accompanying drawings three embodiments of the invention are shown. Similar parts of the two embodiments have the same references.

In the embodiments according to Fig. 1 $a$ is an internal combustion engine, $b$ its governor arranged to be adjusted through gearing $i$, $c$ the main generator, $d$ the field excitation winding of the generator, $f$ the exciter machine, $g$ the self-excited field excitation winding of exciter machine $g$, with a regulating resistance $h$ which is adjustable through the gearing $i$ by means of the handwheel $k$. Both the main generator $c$ and the exciter $f$ are driven by the engine $a$ through the shaft $m$. The generator $c$ supplies current for motors $n$ for driving the vehicle, which, in the disclosed embodiment, are shown as connected in parallel, with their field excitation windings $o$ connected in series with the windings of relays $p_1$ to $p_4$. The relays $p_1$ to $p_4$ control the circuits of the switches $q_1$ to $q_4$, which serve the purpose of step-by-step short-circuiting of the resistances $r$ included in series with the field excitation winding of the main generator. The windings of relays $q_1$ to $q_4$ are successively connected through the contacts of a control drum $s$ and the contacts of relays $p_1$ to $p_4$ to the terminals of the exciter $f$.

Let it be assumed, that the generator exciter resistances $r$ are partially short-circuited by the step-by-step closing of the switches $q$ and thereby regulated. Whether the switches are operated electromagnetically or electro-pneumatically, they are actuated by controlling currents which are switched in and out by the controller drum $s$. Each switch $q$ is associated with a blocking relay $p$, over the contacts of which the corresponding controlling current for windings of relays $q_1$ to $q_4$ is conducted. The blocking relays are energized by the generator current, or a current proportional to it, and act at a definite current limit, which differs from one relay to another, to overcome the action of gravity, the force of a spring or any other opposing force. By actuation of the blocking relays the controlling circuit is affected, for instance is opened. Each switch may thus be apportioned a current limit, after exceeding which the switch can no longer be closed, as the controlling current is opened by the associated blocking relay. Thus, the driver will, for instance, when starting, turn the control drum $s$ forward, causing the step-by-step closing of the exciter control switches $q$. All the already closed switches $q$ can of course remain closed, as they are at the short-circuited side of the resistance $r$. Upon the control drum $s$ reaching the limit position corresponding to the prevailing generator current, the switch $q$ which is last closed will be opened, even if control drum $s$ be advanced to and be held in its forward limit position. As soon as the generator current decreases the blocking of the corresponding switches will be removed and these switches automatically closed, causing the excitation of the generator to rise to the upper limit prescribed for it either by the position of the control drum $s$ or by the magnitude of the generator current. This provides an automatic protection against overloading of the engine $a$.

The embodiment shown in Fig. 2 is similar to that according to Fig. 1. It differs, however, from the embodiment according to Fig. 1, more particularly, in that the excitation of the main generator $c$ is regulated, by means of a control drum $s$, which controls the series resistances $r$, driven by a known electro-pneumatic device $u$ through the shaft $v$. On the same shaft $v$ is also mounted a second control drum $w$ for the step-by-step switching in of adjustable resistances $x_1$ to $x_3$. On the hand-controlled gear shaft $i$ there is mounted, a control drum $t$ for controlling the series resistances $r'$ of the exciter circuit of the main generator $c$, and a control drum $y$ for controlling the regulating resistances $h$ of the exciter circuit of the exciter machine $f$.

By turning the hand wheel $k$ provided for the purpose in the driver's cab the engine $a$ may, therefore, be regulated to different speeds of revolution. For the sake of simplicity, only four speeds of revolution are provided for in the drawings. It is assumed, however, that the four speed steps will suffice for all speeds lying within the range of operation of the vehicle.

As in the embodiment according to Fig. 1 of the drawings, the generator $c$ is separately excited by the self-excited exciter machine $f$ which may be driven indirectly or directly by the engine $a$. On the control shaft $i$ of the governor device $b$ for altering the speed of the engine $a$ is the control drum $y$ of the exciter machine $f$ arranged to be rotated in such a manner that the voltage of the exciter machine $f$ will be maintained as constant as far as possible at all speeds of revolution. The driving arrangement $u$ for the control drum $s$ for exciting the generator $c$ is so arranged that, on its switching-on and switching-off valves 1 and 2 being energized, it runs forward, while, on the switching-on valve 1 being de-energized it ceases to move forward and, on both valves 1 and 2 being de-energized, it runs backward. The excitation circuits for the two coils of the valves are led over the contacts of relays 3, 4, which are energized on the one hand by the armature current of the generator and on the other hand by an auxiliary current attuned separately for each control drum position by a suitable adjustment of the resistances $x_1$ to $x_3$. The control of the auxiliary current is effected by the control drum $w$ which is mounted on the same shaft $v$ as the control drum $s$ of the generator excitation and the driving arrangement $u$ and rotates with the same.

The contact relays 3, 4 for the two valve coils 1, 2 of the driving arrangement $u$ are fundamentally alike, with the exception that the number of ampere turns for the response of the switching-off relay 4 is somewhat greater, for instance 15%, than for the switching-on relay 3. The difference between the ampere turns of the two relays 3, 4, should be as small as possible, but must be sufficiently great to cause the relays to operate correctly in the way hereinafter described. Through the auxiliary current being attuned for each position of the control drum the two contact relays 3, 4 are caused to respond to generator currents in accordance with the position of the control drum $s$ of the generator excitation, which always occurs at the full load torque of the engine $a$. As soon as, at any position of the generator control drum $s$, the corresponding current limit is exceeded, the power limiting relay 3 will first respond to de-energize the operating coil at the associated valve 1. By this means the driving arrangement is brought to rest in a known manner and a further increase in the generator torque prevented for the time being. Should the up-grade of the track or the tractive resistance increase, the generator current will increase, in spite of the excitation remaining constant, owing to the series characteristic of the driving motors $n$. Should the generator current increase sufficiently (viz. by the aforementioned 15%), the switching off relay 4 will respond and will cause the driving arrangement $u$ to run in the reverse direction, until the contact relay 4 has dropped again. The excitation of the generator $c$ is thus automatically adjusted to definite values which for each position of the control drum are a predetermined function of the generator current, this function being so determined that the engine $a$ always works with a full torque.

The operation of starting the vehicle shall now be described in detail. The engine $a$ is first started up to the lowest possible speed of revolution with the generator excitation interrupted. With the shaft $i$ of the speed varying arrangement $b$ the switching-in control drum $t$, having for instance two positions, are connected and, on the hand wheel $k$ in the driver's cab being turned, these two positions are passed through before the speed of the engine $a$ is further increased. On the first of these two positions the excitation circuit of the generator $c$ is closed through a series resistance $r'$. On the second step this resistance is short-circuited. Thus, on the first speed step there is a regulation of the excitation by hand, such as is suitable for switching operations with the locomotive running light. Only on the latter of these two steps of the exciter circuits are the two valves 1, 2 of the driving arrangement $u$ switched in and consequently only then begins the automatic operation of the generator control drum $s$. Prior to this the driving arrangement $u$ was in the zero position, owing to the de-energization of the magnets of the two valves 1, 2, and consequently the generator control drum $s$ was set to the greatest resistance $r$, that is to the lowest excitation. At the second step of the drum $t$, as already stated, the automatic operation commences, the generator excitation being now automatically increased, in so far as the generator current permits of it. This takes place on all of the further speed steps on which the switching-in control drum $t$ always permits of the excitation of the valves 1, 2 and short-circuits the additional exciter resistance $r'$ provided for shunting operations.

Should the speed steps of the engine not suffice for ensuring a reliable operation, more particularly for keeping exactly to the times laid down in the time-table, additional resistance steps may be provided between the speed steps in the exciter circuit of the main generator similar to the resistance steps $r'$ (Fig. 2) required for switching operations which are controlled by operating the handwheel $k$. Such an arrangement is shown in Fig. 3 of the drawings and differs from the arrangement as illustrated in Fig. 2 of the drawings only in that in the arrangement according to Fig. 3 the contact arrangement of control drum $t$ is such as to alternately include and exclude the resistance $r'$ in and from the generator excitation circuit during movement of shaft $i$ to rotate the drum $y$ through each control step. With such an arrangement it is to be recommended that those positions in which no additional exciter resistance is connected up, be designated in some way, such as, for example, as main positions. In this way the driver will see at once whether he is driving at a main or a subsidiary position. He may only use the latter when absolutely necessary for keeping to the time laid down in the time-table or when required by a prescribed speed limit for the particular part of the track, as in these subsidiary positions the engine $a$ does not work under full load and therefore works uneconomically. In the present instance it is assumed that the automatically operating arrangement is effective also when driving in the subsidiary positions. In spite of this no oscillations will be produced as the automatic arrangement does not react to definite excitations, but only to definite positions of the generator control drum $s$.

In certain cases it is also desirable that the members which serve to limit the excitation of the main generator shall operate not only in dependence on its armature current, but also in dependence on the speed of revolution of the engine. In the arrangement shown in Fig. 3 this is, for instance, effected by providing additional series resistances $z$ in the auxiliary circuit of the contact relays 3, 4, which are controlled in dependence on the rotary motion of the shaft $i$ being, for instance, gradually short-circuited at the lower speeds of revolutions of the engine $a$.

Except for the modified contact arrangement of the drum $t$ and the addition of resistances $z$ and the cooperating supplementary drum $t'$, the embodiment according to Fig. 3 of the drawings, conforms, in every respect, to the embodiment of the invention according to Fig. 2 of the drawings.

Having now particularly described and ascertained the nature of our said invention and in what manner the same is to be performed, we declare that what we claim is:

1. In apparatus of the class described, in combination, a prime mover, a separately excited electric generator driven thereby, an excitation circuit for said generator having a variable resistance included therein, an exciter machine disposed to supply excitation current to said generator by way of said circuit, an excitation circuit for said machine having a variable resistance included therein, means operative to vary the fuel supply to said prime mover to vary the speed thereof and to simultaneously vary the resistance in the last said circuit to maintain substantially constant the output potential of said exciter machine, and means operative to vary the said resistance in the generator excitation circuit whereby the output power of said generator is varied in accordance with the speed of said generator.

2. In apparatus of the class described, in combination, a prime mover, a separately excited electric generator driven by said prime mover adapted to supply power to translating devices of varying loads, an exciter machine driven by said prime mover disposed to supply excitation current to said generator, an excitation circuit for said generator having a variable resistance included therein, an excitation circuit for said exciter machine having a variable resistance included therein, means operative to vary the supply of operating fuel to said prime mover to vary the speed of operation thereof, said means being operative to simultaneously vary the said resistance in the said excitation machine excitation circuit whereby the output potential of said machine is maintained substantially constant, means operative to vary the said resistance in the generator excitation circuit, and means operative to automatically control the variation of said resistance in the said generator excitation circuit in dependence upon variations in current output of the generator.

3. In an apparatus of the class described, in combination, a prime mover, a separately excited electric generator driven by said prime mover adapted to supply power to translating devices subject to varying loads, an exciter machine driven by said prime mover disposed to supply excitation current to said generator, an excitation circuit for said generator having a variable resistance included therein, an excitation circuit for said exciter machine having a variable resistance included therein, means operative to vary the speed of operation of said prime mover within varying limits and to simultaneously vary the said resistance in the said excitation circuit of the excitation machine to maintain the output potential of said machine substantially constant, means operative to cause step-by-step variation of the said resistance in the generator excitation circuit, and means automatically operative in dependence upon variations in the output current of said generator effective to control the said step-by-step variations of said resistance in said generator excitation circuit, the said step-by-step variations of said resistance being effective to limit the output power of said generator and to thereby maintain the said prime mover at full load torque.

4. In an apparatus of the class described, in combination, a prime mover disposed to be operated at varying speeds, a separately excited electric generator driven by said prime mover adapted to supply power to translating devices of varying loads, an exciter machine driven by said prime mover at speeds varying in dependence upon the variations in speed of said prime mover, the said exciter machine being disposed to supply excitation current to said generator, an excitation circuit for said generator having a variable resistance included therein, an excitation circuit for said exciter machine having a variable resistance included therein, means operative to vary the speed of said prime mover within varying limits and to simultaneously vary the said resistance in the excitation circuit of the excitation machine in dependence upon the variations in speed of operation of said prime mover to maintain the output potential of the said exciter machine substantially constant, means operative to cause step-by-step variation of the said resistance of the said excitation circuit of the generator to vary the output power thereof, and a plurality of relays selectively operative in dependence upon the output current of said generator effective to control the said step-by-step variation of the said resistance thereby maintaining the torque of the said generator at pre-determined limits and to maintain the said prime mover at full load torque for each output value of the generator.

5. In an apparatus of the character described, in combination, a prime mover disposed to be operated at varying speeds, a separately excited generator driven by said prime mover and connected to supply operating current to translating devices subject to varying loads, an exciter machine driven at speeds varying in dependence upon the variations in speed of the said prime mover, the said exciter machine being disposed to supply excitation current to the said generator, an excitation circuit for said generator having a variable resistance included therein operative to vary the excitation thereof, an excitation circuit for said exciter machine having a variable resistance included therein, means operative to vary the speed of operation of said prime mover and to simultaneously vary the said resistance in the excitation circuit of the exciter machine in dependence upon the variations in speed of operation of the prime mover to maintain the output potential of the said excitation machine substantially constant, a plurality of sets of relays operative to conjointly effect variations of said resistance in the generator excitation circuit to vary the output thereof, and a controller movable to a plurality of contact closing positions operative thereat to control the selective actuation of one set of said relays, another set of said relays being operative responsive to the current output of the said generator, the said variations of the said resistance in the said generator excitation circuit being effective to maintain the torque of the generator at pre-determined values and to thereby maintain the prime mover at full load torque.

6. In an apparatus of the character described, in combination, a prime mover disposed to be operated at varying speeds, a separately excited generator driven by said prime mover and connected to supply operating current to translating devices subject to varying loads, an exciter machine driven at speeds varying in dependence upon the variations in speed of the said prime mover, the said exciter machine being disposed to supply excitation current to the said generator, an excitation circuit for said generator having a variable resistance included therein operative to control the excitation thereof, an excitation circuit for said exciter machine having a variable resistance included therein operative to vary the excitation thereof, means operative to vary the speed of operation of the said prime mover, a controller movable to a plurality of operative positions associated with said means operatively responsive to actuation of said means to cause variations of said resistance in the excitation circuit of the exciter machine to maintain substantially constant the output potential of the exciter, a second controller automatically movable to a plurality of operative positions and effective thereat to selectively cause step-by-step variations of the said resistance in the excitation circuit of the said generator to maintain the torque of the latter at pre-determined values and to thereby maintain the said prime mover at full load torque for each speed of operation thereof, the last said controller being actuated to and from said operative positions in dependence upon and responsive to the current output of the said generator.

7. In apparatus of the class described, in combination, a prime mover operable at varying speeds, a separately excited electric generator driven by said prime mover for supplying operating current to translating devices operable at varying loads, an exciter machine driven by said prime mover for supplying excitation current to said generator, an excitation circuit for said generator having a plurality of resistances included therein, an excitation circuit for said machine having a variable resistance included therein, means operable to control variations in the rate of supply of operating fuel to said prime mover and to simultaneously vary the effective value of the last said resistance and to recurrently include and exclude one of said plurality of resistances in and from the said excitation circuit of the generator, and means automatically operable in dependence upon variations in the output current of said generator for causing variations in the effective value of another of said plurality of resistances, the variations in said resistances being effective to limit the output power of said generator and to thereby maintain the said prime mover at substantially full load torque.

8. In apparatus of the class described, in combination, a prime mover operable at varying speeds, a separately excited electric current generator driven by said prime mover for supplying operating current to translating devices operable at varying loads, an exciter machine driven by said prime mover at speeds varying in dependence upon variations in speed of said prime mover and being operable to supply excitation current to said generator over a circuit having a variable resistance included therein, an excitation circuit for said machine having a variable resistance included therein, means operable to control variations in the rate of supply of operating fuel to said prime mover within varying limits and to simultaneously vary the effective value of the second said resistance in accordance with variations in the rate of supply of operating fuel to said prime mover to thereby maintain the output potential of said machine substantially constant, means operable to cause step-by-step variations in the effective value of the first said resistance to thereby vary the excitation of said generator, a plurality of relays selectively operable in dependence upon the output current of said generator for controlling the said step-by-step variations of the first said resistance to thereby maintain the said prime mover at full load torque for each output current value of said generator, each of said relays having a main coil serially connected in the output circuit of said generator and energizable in dependence upon the flow of current therein and an auxiliary coil energizable over a circuit including a source of current supply and a variable resistance, and means associated with and operable by the first said means for varying the effective value of the last said resistance to thereby modify the selective operation of said relays in accordance with variations in the excitation of said machine.

THEODORE BOVERI.
ABRAHAM COUWENHOVEN.